No. 669,652. Patented Mar. 12, 1901.
J. G. MOOMY.
BICYCLE GEAR DRIVING MECHANISM.
(Application filed May 7, 1900.)
(No Model.) 3 Sheets—Sheet 3.
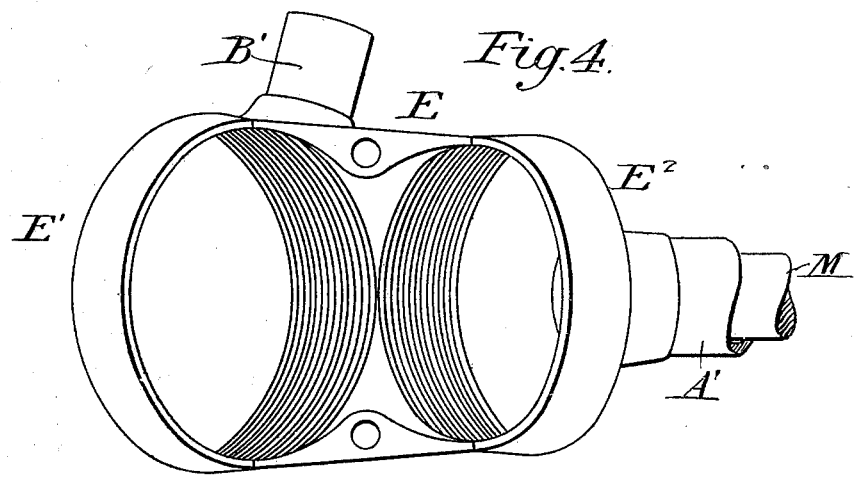
Fig. 4.
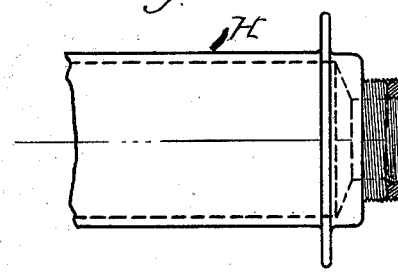
Fig. 5.
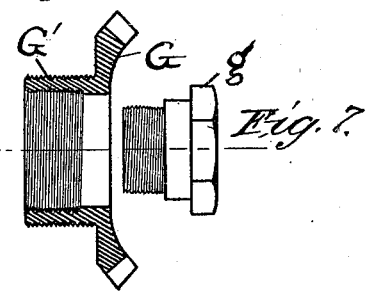
Fig. 6.
Fig. 7.
Witnesses:
M. A. Lord
R. F. Sanger
Inventor—
Joseph G. Moomy
by N. C. Lord
Attorney
THE NORRIS PETERS CO., PHOTO-LITHO., WASHINGTON, D. C.

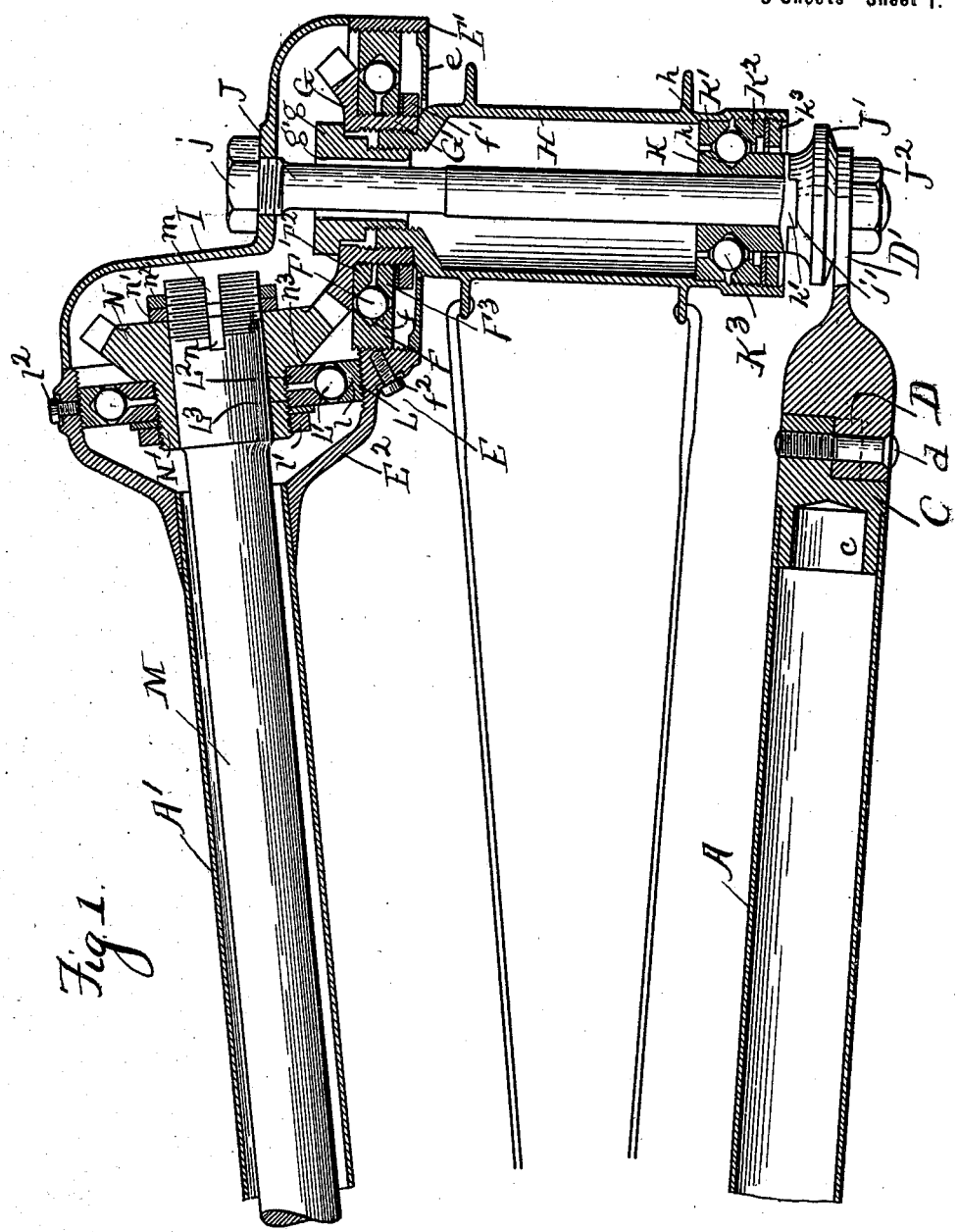

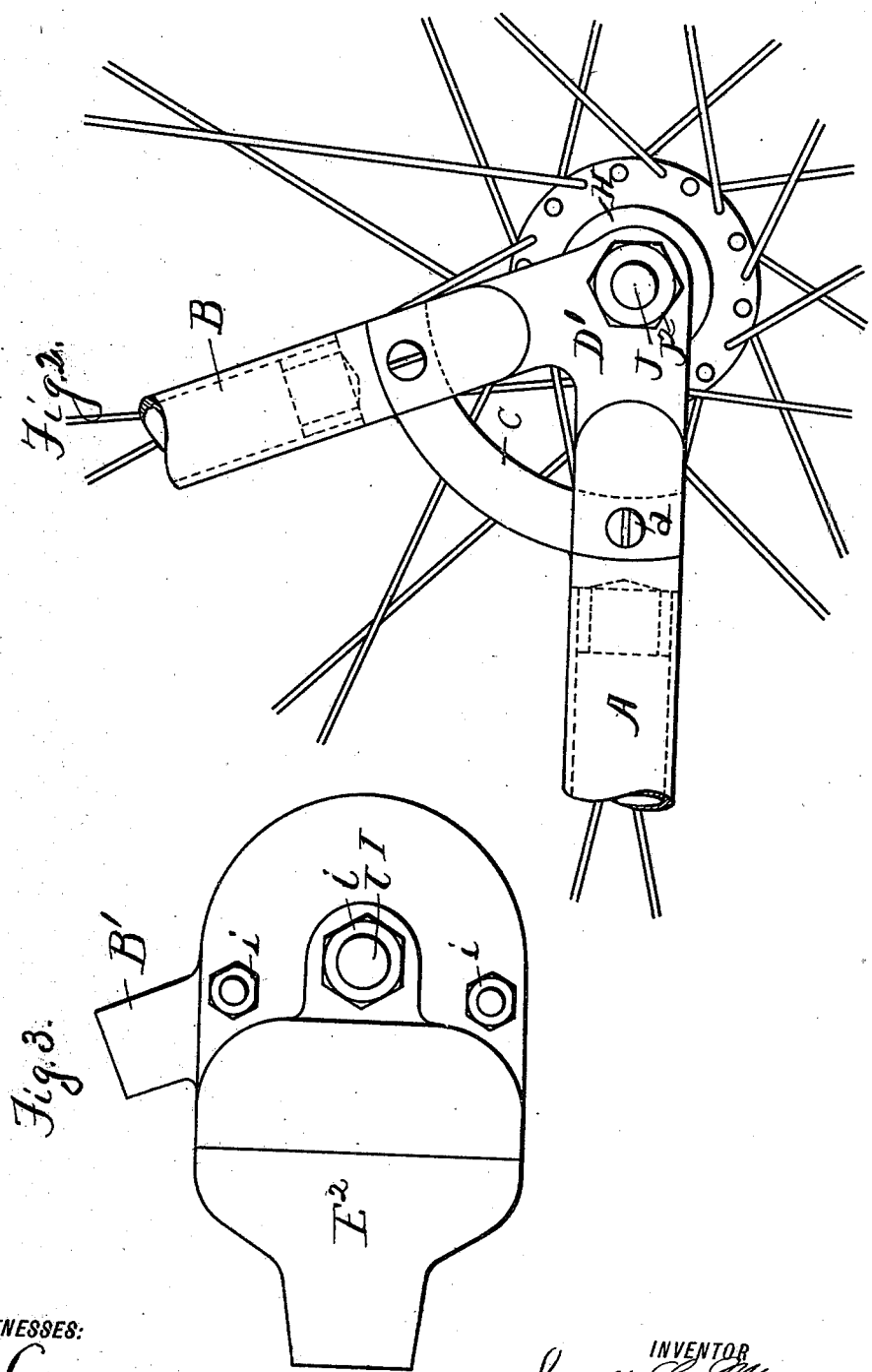

UNITED STATES PATENT OFFICE.

JOSEPH G. MOOMY, OF ERIE, PENNSYLVANIA.

BICYCLE-GEAR-DRIVING MECHANISM.

SPECIFICATION forming part of Letters Patent No. 669,652, dated March 12, 1901.

Application filed May 7, 1900. Serial No. 15,834. (No model.)

*To all whom it may concern:*

Be it known that I, JOSEPH G. MOOMY, a citizen of the United States, residing at Erie, in the county of Erie and State of Pennsylvania, have invented certain new and useful Improvements in Bicycle-Gear-Driving Mechanism; and I do hereby declare the following to be a full, clear, and exact description of the invention, such as will enable others skilled in the art to which it appertains to make and use the same.

This invention relates to bicycle-gear-driving mechanism; and it consists in certain improvements in the construction thereof, as will be hereinafter fully described, and pointed out in the claims.

The invention is illustrated in the accompanying drawings, as follows:

Figure 1 shows a section through the center of the lower rear stays and rear axle. Fig. 2 shows a side elevation of the lower angle between the top and lower stay at the side of the bicycle opposite the driving mechanism. Fig. 3 shows an elevation of the rear bracket. Fig. 4 is a view showing the interior of the rear bracket. Figs. 5, 6, and 7 show details of the construction for securing the hub-gear to the hub.

A marks the lower stay at the side opposite the driving mechanism; B, the upper stay on the same side; A', the stay at the driving side of the wheel, and B' the upper stay at the driving side of the wheel. Arranged between the upper and lower stays B and A is secured a quadrant C, the radius of which is larger than the radius of the adjacent part of the hub of the wheel. This is secured to the stays preferably by means of the lugs c. Registering with the quadrant C is a connecting-piece D, which is removably secured to the quadrant C by the screw d. The connecting-piece D has the rearward extension D', preferably formed to have the appearance of a continuation of the stays A and B. The rear axle J passes through and is secured to this extension. The purpose of this axle-bracket is to allow the removal of a tire without disturbing the bearings of the rear wheel. In order to accomplish this, the bracket or quadrant C must be located far enough up in the fork between the stays A and B to allow the passage of the tire between the adjacent part of the hub of the wheel and the quadrant C. To do this, the axle-bracket D must have a radial length as much greater than the adjacent part of the hub as the tire is thick.

Attached to the rear end of the stay A' is the rear gear-bracket E. This has the side portion $E^2$ and the rear or hub portion E'. The side gear-bearing is arranged in the side portion $E^2$ and the hub gear-bearing is arranged in the rear portion E'. The rear portion is screw-threaded throughout, forming a screw-threaded ring, which preferably forms a complete annulus. Screwed into this is the bearing-ring F, having the V-shaped raceway f. The balls F' are arranged to run in this V-shaped raceway. Screwed on the hub G' of the gear G is the bearing-ring $F^2$, forming one side of the inner raceway of the bearing. The opposite side of the inner raceway is formed by the ring $F^3$. This is also screwed on the gear and is locked in position by the jam-nut f'. It will readily be seen that this bearing forms a complete bearing in itself and that it will sustain a gear in its proper position, regardless of the presence or the absence of any other bearing. The gear G is screwed onto the outer surface of the hub H of the rear wheel. A nut g is screwed into the inner surface of said hub against the gear G. The threads on the inner surface are of the opposite pitch from those of the outer surface of the hub, so that the threads of the gear and nut are opposed to each other. This arrangement locks the gear in position on the hub. Secured to and covering the angle between the side portion $E^2$ and the rear portion E' of the rear bracket is a cap I. It is secured to the bracket by means of the set-screws i. The axle J is screwed through this bracket and extends into the opening g' in the nut g through the inner ring K of the bearings and is screwed into a nut J' and passed through the extension D' and is set in place by a nut $J^2$. Opposed to the ring K are the two bearing-ring sides K' and $K^2$. The ring K' is set against the shoulder h in the hub, and the ring $K^2$ is locked in position by the jam-nut $k^3$. The two sides of the bearing-rings K' and $K^2$ form between them a V-shaped raceway opposite to the V-shaped raceway k in the ring K. The balls $K^3$ are arranged to run in this raceway. At the outer end of the ring K is a segmental lug $k'$, which is arranged to fit in a groove $j'$ in the nut $J'$. This simply prevents the ring $k$ from working on the shaft and thus becoming loose.

It will be noted that the axle J, by means of its head $j$, may be unscrewed from the nuts $J'$ and $J^2$ and the cap I and withdrawn from the wheel. The hub-bearing at the driving side of the wheel, however, will maintain the wheel in place after the removal of the axle. By removing the nut $g$ the hub of the wheel can be disengaged from the gear G without disturbing any of the bearings and the wheel thus removed. In this way the adjustment of the gears is not interfered with. If it is desired, however, the axle may be removed and also the axle-bracket D. When this is done, the dust-cap $e$ may be removed, the set-screw $f^2$ loosened, and the hub bearing and gear withdrawn through the inner side of the rear portion $E'$ of the bracket E. This is possible because the interior diameter of the ring $E'$ is greater than the diameter of the gear G, and the removal of the bracket D allows sufficient side movement of the hub and wheel to permit of this operation. The wheel can be put in place readily by simply screwing in a ring F until the gear G is in adjustment and then locking it in place with the set-screws $f^2$. In assembling the wheel the ring F may be introduced from the outside of the rearward ring or bracket $E'$, as this bracket is screw-threaded entirely through it. This arrangement of the rear portion of the bracket E is not only desirable by reason of the ease in which the parts may be assembled and taken apart, but also because of its cheapness of manufacture.

Screwed into the side portion $E^2$ of the bracket E is the bearing-ring L, having the V-shaped raceway $l$. The balls $L'$ are arranged in this raceway. A shaft M extends through the side stay $A'$ from the crank-hanger and passes through the rear side gear N. The shaft M has a slot $m$ at its rear end, and the gear N is provided with a somewhat similar slot in which is placed the key $n$. The key $n$ is locked in position by means of the nut $n'$, and the nut $n'$ is locked in position by means of the jam-nut $n^2$. One side $L^2$ of the bearing-ring is screwed onto the hub $N'$ of the gear N against the shoulder $n^3$. The opposite side $L^3$ of said inner ring is screwed on the same hub and locked in position by means of the jam-nut $l'$. The sides $L^2$ and $L^3$ form between them a V-shaped groove which forms the opposite side of bearing to the ring L. The ring L is locked in position by means of the set-screw $l^2$. This single row of balls maintains the gear N in its proper position independently of any other bearing. The bearings inclosed in the bearing-ring L can all be introduced into the bracket $E^2$ from the rear and can be readily adjusted after the removal of the shaft to adjust the gear N.

In assembling the parts if the ring F, with the bearing and gear in place therein, is placed in the ring $E'$ from the side of the ring $E'$ opposite the driving-wheel it must be screwed into the bracket $E'$ a sufficient distance past its final adjustment to allow the insertion of the ring L in the side portion $E^2$ of the bracket. After the ring L carrying its bearing and the gear N are in place the ring F is screwed out to its position or final adjustment. Where the ring F is assembled by insertion from the inner or wheel side of the bracket portion $E'$, the ring L, with the bearing and gear N, should be inserted before the ring F is brought to its final adjustment.

What I claim as new is—

1. In a bicycle, the combination with the rear-wheel hub; the axle and driving-gear; of a removable axle-bracket at the opposite side of the wheel from the driving-gear, to which the axle is secured, said bracket being of greater radius than the adjacent portion of the driving-wheel hub, whereby a tire may be removed or introduced through the space between the hub and the remaining portion of the frame, after the removal of the axle-bracket; the top and lower stays of the frame; a connecting-piece between said top and lower stays; and means for securing the removable axle-bracket to the frame formed by the stays and connecting-piece.

2. In a bicycle, the combination with the rear axle and the driving-wheel hub thereon; of an axle-bracket forming a connecting-piece, D, having the bracket extension, $D'$, of greater radial length than the radius of the adjacent portion of the wheel-hub, whereby a tire may be removed or introduced through the space between the hub and the remaining portion of the frame, after the removal of said connecting-piece; the top and lower stays, B and A; the quadrant, C, arranged to register with a connecting-piece, D, when in place; and means for removably securing the connecting-piece, D, to the frame, formed by the stays A and B, and the quadrant, C.

3. In a bicycle, the combination of a rear bracket of annular form and having an internal screw-thread; a driving-wheel-hub gear-bearing, said bracket being arranged relatively to the other parts of the frame to permit the insertion of said bearing in said screw-threaded bracket from the side opposite the wheel-hub, and said bearing being adapted to be assembled in said bracket by being screwed into said bracket from the side opposite the said wheel-hub; said wheel-hub arranged in said bearing; a gear secured on said wheel-hub; and the frame.

4. In a bicycle, the combination of a rear gear-bracket of annular form having an internal screw-thread extending through said bracket; a driving-wheel-hub gear-bearing, said bracket being arranged relatively to the other parts of the frame to allow the insertion of the bearing in said bracket from either side of said bracket, and said bearing being adapted to be screwed into the opening in said bracket from either side of said bracket; the rear-wheel hub secured in said bearing; and the frame.

5. In a bicycle, the combination of the bracket-ring E', the bearing-ring, F, having the V-shaped raceway, $f$; the gear, G, secured to the hub, H; the hub H; the bearing-rings $F^2$ $F^3$, arranged on said gear; the balls, F', completing said bearing; and means for securing the ring, F, in position.

6. In a bicycle, the combination of the bracket E, having the ring, E', said ring having the internal screw-thread; the ring, F, screwed therein and having the V-shaped raceway, $f$; the gear, G, secured to the hub, H; the hub H; the bearing-rings, $F^2$ and $F^3$, carried by said gear; the balls, F', completing said bearings; means for securing the ring, F, in position; the four-point bearing at the opposite side of the hub, having its inner ring, K, arranged to form a sliding fit on the axle, said bearing being arranged to support the hub; the axle passed through the hub and the ring, K; the cap, I, arranged over the bracket, E; the axle, J, screwed into said bracket and extending through the hub and through the ring, K.

7. In a bicycle, the combination of the bracket, E, having the annular side bracket, $E^2$; a rear bracket, E'; a four-point bearing screwed into the rear bracket; a gear carried by said bearing; a four-point bearing in said side bracket; a gear carried by said side bearing; a hub adapted to be secured to said gear after the rear gear has been adjusted with the side gear; and means for locking said bearing in different positions in said bracket for adjusting said gears.

In testimony whereof I affix my signature in presence of two witnesses.

JOSEPH G. MOOMY.

Witnesses:
R. F. SANZA,
A. F. DANELSON.